United States Patent

Kerst

[15] 3,664,975
[45] May 23, 1972

[54] FLAME RESISTANT POLYURETHANE PREPARED BY ADDING AN ETHANE DIPHOSPHONATE INTO THE URETHANE-FORMING MIXTURE

[72] Inventor: Al F. Kerst, Littleton, Colo.
[73] Assignee: Monsanto Company, St. Louis, Mo.
[22] Filed: Apr. 13, 1970
[21] Appl. No.: 27,985

[52] U.S. Cl...................260/2.5 AJ, 106/163, 260/18 PN, 260/22 R, 260/45.7 P, 260/75 NR, 260/77.5 AR, 260/502.4 P, 260/862, 260/932
[51] Int. Cl...........................................C08g 22/16
[58] Field of Search..................260/2.5 AJ, 77.5 AR, 75 NR, 260/932

[56] References Cited

UNITED STATES PATENTS

| | | | |
|---|---|---|---|
| 3,458,457 | 7/1969 | Jacques et al. | 260/77.5 |
| 3,092,651 | 6/1963 | Friedman | 260/77.5 |
| 3,385,801 | 5/1968 | Birum et al. | 260/77.5 |
| 3,525,708 | 8/1970 | Clark et al. | 260/77.5 |
| 3,544,509 | 12/1970 | Carroll et al. | 260/2.5 |

*Primary Examiner*—Donald E. Czaja
*Assistant Examiner*—Eugene C. Rzucidlo
*Attorney*—Herbert B. Roberts, Roger R. Jones, James J. Mullen and Neal E. Willis

[57] ABSTRACT

Fire resistant polyurethane compositions are prepared by adding to the urethane-forming reaction mixture a substituted ethane diphosphonate having the formula

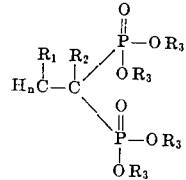

wherein $R_1$ and $R_2$ are hereinafter defined, $R_3$ is hydrogen or an organic radical, and $n$ is an integer having a value of 1 or 2.

4 Claims, No Drawings

FLAME RESISTANT POLYURETHANE PREPARED BY ADDING AN ETHANE DIPHOSPHONATE INTO THE URETHANE-FORMING MIXTURE

ORGANIC COMPOSITIONS

This invention relates to organic polymeric compositions and, more particularly, provides novel polymeric compositions having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general.

An additional object of this invention is to provide in polymer compositions an organic phosphorus compound having reduced tendency to decompose and/or degrade from the polymer compositions when the polymer system is subjected to elevated temperatures.

Other objects, advantages, and aspects of this invention will become apparent from a reading of the specification and the appended claims.

This invention provides, as new compositions of matter, an organic synthetic polymer (linear or cross-linked) in combination with a substituted ethane diphosphonate as defined herein.

Another aspect of this invention provides, as new compositions of matter, synthetic copolymeric materials prepared using as a comonomer a substituted ethane diphosphonate as defined herein.

A still further aspect of this invention provides a method for reducing the tendency of organic synthetic polymers to burn after a source of burning heat has been removed from the polymeric composition by incorporating into the organic synthetic polymeric compositions a substituted ethane diphosphonate as defined herein.

Other objects will become apparent from a reading of the following description.

It has been found that certain organo-phosphorus compounds, i.e., substituted ethane diphosphonic acids and their esters, can be added to, blended with, or co-polymerized with the synthetic polymeric materials to accomplish the aforegoing objectives.

These substituted ethane diphosphonic acids and their esters have the following generic formula:

(I)
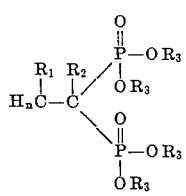

In the above formula I, $R_1$ can be from the group oxygen; halogen; hydroxy; —CN; —N$(R_4)_2$, where $R_4$ is from the group hydrogen and alkyl containing from one to 30 carbon atoms, preferably from one to eight carbon atoms, and more preferably from one to four carbon atoms; —XR$_5$, where X is from the group oxygen and sulfur and $R_5$ is from the group alkyl containing from one to 30 carbon atoms, preferably one to eight carbon atoms, more preferably one to four carbon atoms; $C_6H_5$ (phenyl) and CH$_2$·C$_6$H$_5$ (benzyl); acetoxy; —SO$_3R_4$ where $R_4$ is the same as defined above; benzoyl; —CO$_2$H; and —CH(COOR$_6$)$_2$, where $R_6$ is an alkyl group containing from one to 30 carbon atoms, preferably from one to eight carbon atoms, and more preferably from one to four carbon atoms.

In the aforegoing general formula I, $R_2$ is from the group $R_1$, except oxygen, and hydrogen. It is to be understood that $R_2$ then is never oxygen and $R_2$ is only hydrogen when $R_1$ is oxygen. Additionally, it is to be understood that in all cases, except when $R_1$ is oxygen and $R_2$ is hydrogen, at least $R_1$ or $R_2$ is a hydroxy group. In other words and for exemplary purposes only, when $R_1$ is chlorine, $R_2$ must be a hydroxy group.

In conjunction with the proviso that $R_2$ is only hydrogen when $R_1$ is oxygen with reference to the aforegoing general formula I, $n$ is an integer having a value of 1 or 2 and $n$ is only 1 when $R_1$ is oxygen.

In formula I, $R_3$ is from the group hydrogen, alkyl, alkenyl, aryl, alkyl aryl, cyclic and alicyclic.

In conjunction with the foregoing general formula I and more specifically when the ethane diphosphonate is in the ester form thereof, i.e., $R_3$ is an organic radical heretofore mentioned, the preferred substituents are the following:

a. alkyl — containing from about one to about 18 carbon atoms (more preferably one to four carbon atoms);

b. alkenyl — containing from about one to about 18 carbon atoms;

c. aryl — phenyl, naphthyl, anthryl, or phenanthryl;

d. alkyl aryl — hydroxy, halogen, lower alkyl, (alkaryl) having from one to about six carbon atoms, and amino substituted phenyl, naphthyl, anthryl, or phenanthryl;

e. cyclic - containing from about four to about eight carbon atoms and there may be present in the ring either a nitrogen, sulfur, oxygen or phosphorus atom; and f. alicyclic - containing from about four to about 10 carbon atoms.

It is to be understood that all of the compounds falling within the above formula I and as heretofore defined are generically described herein as "ethane diphosphonates." In other words then, the acids, esters and mixtures thereof are all generically described herein as ethane diphosphonates.

In general, the ethane diphosphonates are prepared by contacting an epoxy ethane diphosphonate having the following formula:

(II)
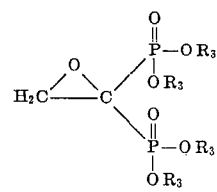

wherein $R_3$ is the same as defined above, with a de-oxiranization agent which opens the ring of said epoxy compound (and provides the substituents on the carbon atoms) to form the ethane diphosphonates falling within formula I. It is to be understood that the term "epoxy ethane diphosphonate" used herein generically describes and encompasses the acid and ester forms, and said term is designated at times herein EEDP for the sake of brevity.

The de-oxiranization agents which effect this "ring opening" are from the group water, ammonia, primary amines, secondary amines, acids, malonates, alcohols, mercaptans, Lewis acid catalysts and mixtures thereof. The specific application of these de-oxiranization agents are disclosed in the processes which are described hereinafter.

In conjunction with the water "agent," this "ring opening" of EEDP is effected by hydrolysis at a temperature of from about 50° C. to about 150° C. with or without an inert diluent and acid catalyst, e.g. (respectively), dioxane and HCl.

As illustrative of the ethane diphosphonates which can be prepared according to the aforementioned hydrolysis reaction of EEDP, there may be mentioned, without limitation, the following compounds:

1. H$_2$C(OH)C(OH)(PO$_3$H$_2$)$_2$
1,2 dihydroxy ethane-1,1-diphosphonic acid
2. H$_2$C(OH)C(OH)[PO$_3$(C$_2$H$_5$)$_2$]$_2$
tetraethyl 1,2 dihydroxy ethane-1,1-diphosphonate
3. H$_2$C(OH)C(OH)(PO$_3$HC$_6$H$_5$)$_2$
diphenyl 1,2 dihydroxy ethane-1,1-diphosphonate
4. H$_2$C(OH)C(OH)(PO$_3$HC$_4$H$_9$)$_2$
dibutyl 1,2 dihydroxy ethane-1,1-diphosphonate The de-oxiranization agents ammonia, primary amines and secondary amines are generically equated $(R_4)_2NH$ and $R_4$ has the same connotation hereinbefore ascribed. This "ammonolysis" reaction of $(R_4)_2NH$ with EEDP is generally conducted at a temperature between about $-40°$ C. and about 150° C. under atmospheric conditions.

As illustrative of the ethane diphosphonates which can be prepared according to the aforementioned ammonolysis of EEDP, there may be mentioned, without limitation, the following compounds:

5. $H_2C(NH_2)C(OH)(PO_3H_2)_2$
 2-amino-1-hydroxyethane-1,1-diphosphonic acid
6. $H_2C(OH)C(NH_2)(PO_3H_2)$
 2-hydroxy-1-aminoethane-1,1-diphosphonic acid
7. $H_2C(NH_2)C(OH)[PO_3(C_2H_5)_2]_2$
 tetraethyl 2-amino-1-hydroxyethane-1,1-diphosphonate
8. $H_2C(NHCH_3)C(OH)(PO_3H_2)_2$
 2-methylamino-1-hydroxyethane-1,1-diphosphonic acid
9. $H_2C[N(C_2H_5)_2]C(OH)(PO_3H_2)_2$
 2-diethylamino-1-hydroxyethane-1,1-diphosphonic acid
10. $H_2C[N(C_4H_9)_2]C(OH)(PO_3HC_4H_9)_2$
 dibutyl 2-dibutylamino-1-hydroxyethane-1,1-diphosphonate The "acid" de-oxiranization agents, designated herein as HZ, relate to certain inorganic and organic acids which effect the ring opening. Specifically, the cation, Z, is from the group halogen (such as chlorine, bromine, fluorine and the like), — CN, acetoxy ($CH_3COO-$), sulfonate ($SO_3R_4$ wherein $R_4$ has the same connotation as heretofore set forth and is from the group hydrogen and alkyl), benzoyl ($C_6H_5CO-$), and carboxy ($HOOC-$). This acid reaction is generally conducted at a temperature between about $-10°$ C. and 150° C. under atmospheric conditions.

As illustrative of the ethane diphosphonates which can be prepared according to the aforementioned acid reaction with EEDP, there may be mentioned, without limitation, the following compounds:

11. $H_2C(Cl)C(OH)(PO_3H_2)_2$
 2-chloro-1-hydroxyethane-1,1-diphosphonic acid
12. $H_2C(OH)C(Cl)(PO_3H_2)_2$
 2-hydroxy-1-chloroethane-1,1-diphosphonic acid
13. $H_2C(CN)C(OH)[PO_3(C_2H_5)_2]_2$
 tetraethyl 2-cyano-1-hydroxyethane-1,1-diphosphonate
14. $H_2C(SO_3H)C(OH)(PO_3HC_2H_5)_2$
 ethyl 2-sulfo-1-hydroxyethane-1,1-diphosphonate
15. $H_2C(F)C(OH)(PO_3HC_6H_5)_2$
 diphenyl 2-fluoro-1-hydroxyethane-1,1-diphosphonate
16. $H_2C(SO_3C_2H_5)C(OH)(PO_3H_2)_2$
 2-ethylsulfo-1-hydroxyethane-1,1-diphosphonic acid The malonate de-oxiranization agent referred to herein as $MHC(COOR_6)_2$, wherein $R_6$ is the same as hereinbefore ascribed and M is an alkali metal such as sodium, can be reacted with EEDP at a temperature between about 5° and about 240° C. under atmosphere conditions to form said ethane diphosphonates.

As illustrative of the ethane diphosphonates which can be prepared according to the aforementioned malonate reaction with EEDP, there may be mentioned, without limitation, the following compounds:

17. $HC(COOC_2H_5)_2CH_2C(OH)(PO_3H_2)_2$
 diethyl (2-hydroxy-2,2-diphosphonoethyl) malonate
18. $H_2C(OH)C(PO_3H_2)_2CH(COOC_2H_5)_2$
 diethyl (2-hydroxy-1,1-diphosphonoethyl) malonate
19. $HC(COOC_4H_9)_2CH_2C(OH)(PO_3H_2)_2$
 dibutyl (2-hydroxy-2,2-diphosphonoethyl) malonate
20. $H_2C(OH)C[PO_3(C_2H_5)_2]_2CH(COOCH_3)_2$
 dimethyl (tetraethyl 2-hydroxy-2,2-diphosphonoethyl) malonate
21. $H_2C(COOCH_3)_2CH_2C(OH)(PO_3H_2)_2$
 dimethyl (2-hydroxy-2,2-diphosphonoethyl) malonic acid The alcohol and mercaptan de-oxiranization agents, generically referred to herein as $R_5XH$, wherein $R_5$ is the same as hereinbefore ascribed and X is oxygen or sulfur, can be reacted with EEDP at a temperature between 5° C. and 180° C. under atmospheric conditions to form said ethane diphosphonates. The alcohols utilized are the monoatomic aliphatic alcohols containing from one to 30 carbon atoms, preferably from one to eight carbon atoms, including the respective isomers thereof. Typical alcohols include, for example, methanol, ethanol, propanol and n-butyl alcohol. It is also within the scope of these processes to utilize alcohols such as phenol and benzyl alcohol. The mercaptans utilized are the aliphatic mercaptans containing from one to about 30 carbon atoms, preferably from one to eight carbon atoms, and include, for exemplary purposes only, methyl mercaptan, ethyl mercaptan, propyl mercaptan and n-butyl mercaptan. The isomers of the various mercaptans are also included herein.

As illustrative of the ethane diphosphonates which can be prepared according to the aforementioned reaction of EEDP with either alcohols or mercaptans, there may be mentioned, without limitation, the following compounds:

22. $H_2C(OCH_3)C(OH)(PO_3H_2)_2$
 2-methoxy-1-hydroxy ethane-1,1-diphosphonic acid
23. $H_2C(OH)C(OCH_3)(PO_3H_2)_2$
 2-hydroxy-1-methoxy ethane-1,1-diphosphonic acid
24. $H_2C(OC_2H_5)C(OH)[PO_3(C_2H_5)_2]_2$
 tetraethyl 2-ethoxy-1-hydroxy ethane-1,1-diphosphonate
25. $H_2C(SCH_3)C(OH)(PO_3H_2)_2$
 2-thiomethyl-1-hydroxy ethane-1,1-diphosphonic acid
26. $H_2C(OC_6H_5)C(OH)(PO_3H_2)_2$
 2-phenoxy-1-hydroxy ethane-1,1-diphosphonic acid
27. $H_2C(SC_6H_5)C(OH)(PO_3H_2)_2$
 2-thiophenyl, 1-hydroxy ethane-1,1-diphosphonic acid The reaction of EEDP in the presence of a metal halide Lewis acid yields the "oxy" derivative according to the following equation:

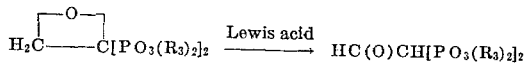

In conjunction with the above reaction, a wide variety of Lewis acids can be utilized in order to effect an acid catalyzed rearrangement of the epoxy ethane diphosphonate. There may be mentioned for exemplary purposes only and without any limitation metal halide Lewis acids such as boron trifluoride, zinc chloride, magnesium bromide, ferric chloride, stannic chloride, titanium chloride, zirconium chloride, aluminum chloride and the like. In conjunction with the utilization of the Lewis acid for the acid catalyzed rearrangement, it is preferred to first dissolve or suspend the metal halide in a non-aqueous inert aprotic solvent such as nitromethane, dichloromethane, nitrobenzene, nitropropane, chlorobenzene, dichlorobenzene, dichloroethane, tetrachloroethane, perchloroethylene, petroleum ether, carbon tetrachloride, chloroform, carbon disulfide, ethyl ether, benzene and the like, and then contact the resultant solution or slurry with the EEDP material. The amount of solvent utilized is not a limiting factor as long as that amount chosen does not substantially adversely affect the preparation of the desired end product.

The acid catalyzed rearrangement of the epoxy ethane diphosphonate is generally conducted with the epoxy ethane dipphosphonate and a Lewis acid catalyst (and, if desired, an inert aprotic solvent such as ethyl ether) at a temperature between about $-20°$ C. and 150° C., and under atmospheric conditions. Higher or lower temperatures can be utilized, e.g., as low as 50° C. and as high as 250° C., depending, for example, upon the boiling point of said solvent. It is within the scope of the present invention that super-atmospheric (e.g., from about 1 to 10 atmospheres) and sub-atmospheric (e.g. ½ to 760 mm Hg) conditions and also in an inert atmosphere such as nitrogen or helium may be utilized where one so desires.

The quantity of Lewis acid catalyst utilized in conjunction with the acid catalyzed rearrangement will vary somewhat, depending upon the type of metal halide Lewis acid catalyst utilized, the temperature at which the reaction takes place, and, in some instances, the pressure of the system. It is to be understood that any amount of Lewis acid catalyst can be utilized as long as that amount is not substantially detrimental to achieving the desired end product. It is found that from about 0.01 to about 4 mole equivalents of said catalyst for each mole of EEDP starting material suffices to form the aforesaid "oxy," derivative in satisfactory yields.

As illustrative of the ethane diphosphonates which can be prepared according to the aforementioned acid catalyzed rearrangement of EEDP, there may be mentioned, without limitation, the following compounds:

28. $HC(O)C(H)(PO_3H_2)_2$
    2-oxy ethane-1,1-diphosphonic acid
29. $HC(O)C(H)[PO_3(C_2H_5)_2]_2$
    tetraethyl 2-oxy ethane-1,1-diphosphonate
30. $HC(O)C(H)(PO_3HC_4H_9)_2$
    dibutyl 2-oxy ethane-1,1-diphosphonate The aforementioned epoxy ethane diphosphonates (EEDP) which are the basic starting materials in conjunction with the preparation of the ethane diphosphonates falling within formula I can be prepared, for example, by reacting the disodium salt of ethylene diphosphonic acid, i.e.,

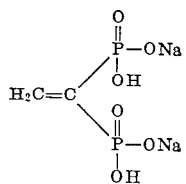

with hydrogen peroxide (which functions as an epoxidizing agent) in the presence of a catalyst such as sodium tungstate. The above ethylene diphosphonate, also sometimes referred to in the art as vinylidene diphosphonate, is known in the art (in its ester form and processes for preparing the same) as exemplified by U.S. Pat. No. 3,062,792, which is incorporated herein by reference. The ethylene diphosphonic acids and salts per se and processes for preparing the same as described in Canadian Pat. No. 811,736, which is incorporated herein by reference.

The presently provided ethane diphosphonates are useful as modifiers as well as flame retardants for synthetic polymeric materials. These ethane diphosphonates may be used in a quantity which is equal to that of the polymer, but in most instances favorable results with respect to improvement in flame-retardance are obtained at concentrations which are definitely lower. In some cases amounts as little as 0.1 percent, by weight of polymer and ethane diphosphonate, may be used, although generally it is preferred that amounts of from about 1 percent to 50 percent be used to provide polymeric systems with reduced burning rates. Use of the present ethane diphosphonate with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence in order to arrive at optimum beneficial effect suited to the purposes for which the polymeric composition is designed, only routine testing, involving variation of adjuvant quantity is generally required, although in some instances one or more members of the whole class of the presently provided ethane diphosphonate will be found to impart a degree of modification at a low concentration which can be attained by other members of the class at significantly higher concentrations.

The flammability test for measuring the burn qualities of polymer samples is for the most part essentially the standard burn test known as ASTM-D1692-59T (which is incorporated herein by reference) or modifications thereof. As used herein a polymeric composition is considered "non-burning" if there is no evidence of burning (flame or progressive glow) after removal of the burner and a "self-extinguishing" sample is one that continues to burn after removal of the burner but the flame goes out before the second gauge line is reached.

In general, the ethane diphosphonates can be used as a comonomer in place of or in combination with conventionally used dibasic or polybasic carboxylic anhydrides, such as phthalic and maleic anhydride, to form synthetic polymeric systems. The ethane diphosphonates, for example, can undergo reactions with reactive hydrogen-containing materials which include polyamines containing at least two amine groups with a reactive hydrogen on each group and polyhydroxyl-containing organic compounds (containing at least two hydroxyl groups with a reactive hydrogen on each group) including polyhydric alcohols, phenols and the like. A distinct advantage of the present invention, therefore, is the flexibility which the ethane diphosphonates exhibit in formulating and preparing polymeric compositions. For example, they can be used with preformed monomers, copolymers and the like or they can be used as a comonomer to form polymers with other appropriate monomer materials.

In general, the polyhydric alcohols which are useful in preparing polymers by reaction with the ethane diphosphonates include glycerol, pentaerythritol (including di- and tripentaerythritol), sorbitol, mannitol, and the glycols (including the alkyleneglycols and the polyalkylene glycols in which the alkylene group is $(—CH_2—)_n$ wherein n is an integer from 2 to 10), such as, ethylene glycol, propylene glycol, butylene glycol, diethylene glycol, dipropylene glycol, triethylene glycol, tetraethylene glycol, hexamethylene glycol, decamethylene glycol and the like.

In general, the polyamines which are useful in preparing polymers by reaction with the ethane diphosphonates include the alkylene polyamines (particularly the alkylene diamine, triamine, and tetraamines in which the alkylene group is $(—CH_2—)_n$ wherein n is an integer from 2 to 10) such as, ethylene diamine, diethylene diamine, hexamethylene diamine, decamethylene diamine, triethylene tetraamine, pentamethylene triamine, hexamethylene tetraamine, butylene diamine, and the like.

Usually, all that is necessary is to mix the ethane diphosphonates and polyamine and/or polyhydric organic compounds, preferably in amounts of about one functional substituent containing carbyl group, e.g.

per amine or hydroxyl group, although amounts on said carbyl group to amine or hydroxyl group ratio of from about 1:10 to 10:1 can be used, and heat to elevated temperatures, such as from about 40° C. to the melting point of the reactants (under atmospheric pressure, although sub-atmospheric pressures as well as pressures in excess of atmospheric can be used) with temperatures above about 90° C. being preferred. In addition, it is sometimes advantageous to employ an inert liquid non-aqueous reaction medium such as paraffin hydrocarbons, benzene, toluene, xylene, dioxane, acetone, dimethyl formamide, tetrahydrofuran and the like and after polymerization removing the medium such as by distillation and/or decantation in order to recover the polymer.

Synthetic polymeric materials, i.e., those high molecular weight organic materials which are not found in nature, with which the ethane diphosphonates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flame-proofed hereby consists of the polymerized vinyl and vinylidene compounds, i.e., those having the

radical. Compounds having such a radical are, e.g., the solid polymeric alkenes, such as polyethylene, polypropylene, polyisobutylene or ethylene propylene copolymer; polymerized acrylyl and alkacrylyl compounds such as acrylic, chloroacrylic and methacrylic acids, anhydrides, esters, nitriles and amindes, for example, acrylonitrile, ethyl or butyl acrylate, methyl or ethyl methacrylate, methoxymethyl or 2-(2-butoxyethoxy)ethyl methacrylate, 2-(cyano-ethoxy) ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluorethylene; polyvinyl alcohol; the vinyl carboxylates such as vinyl acetate, vinyl chloroacetate, vinyl propionate, and vinyl 2-ethyl-hexanoate; the N-vinyl imides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the ethane diphosphonates. Examples of such copolymers or terpolymers are those obtained by polymerization of the following monomer mixtures: vinyl chlorine - vinyl acetate, acrylonitrile - vinylpyridine, styrene - methyl methacrylate; styrene - N-vinylpyrrolidone, cyclohexyl methacrylate - vinyl chloroacetate, acrylonitrile - vinylidene cyanide, methyl methacrylate - vinyl acetate, ethyl acrylate - methacrylamide - ethyl chloroacrylate, vinyl chloride - vinylidene chloride - vinyl acetate, etc.

Other presently employed polymers of compounds having the ethylenic group,

are homopolymers, copolymers and terpolymers of the α, β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α, β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present ethane diphosphonates are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present ethane diphosphonates are also the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxy benzenes, naphthalenes and the like, the dihydroxydiphenyl ethers, sulfones, alkanes [bis(4-hydroxyphenyl)2,2-propane], ketones and the like.

Advantageously modified by the present ethane diphosphonates are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene - acrylonitrile copolymer, isobutylene - butadiene copolymer (butyl rubber) butadiene - styrene copolymer of 2-chloro-butadiene - vinylidene cyanide - acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate - diallyl methacrylate copolymer or butadiene - styrene - divinyl-benzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present ethane diphosphonates to give polymeric materials of enhanced utility.

Polymeric materials with which the present ethane diphosphonates can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin - sulfur dioxide polymers, the phosphines, phosphites, phosphates and phosphonates such as diphenylvinylphosphine, allyl phosphite and methallyl phosphite, ethylene phosphonic acid and styrenephosphonic acids and their salts, esters and amides; the silanes such as dimethylvinylsilane, diphenylvinylsilane and methylphenylvinylsilane, etc.

A class of synthetic polymeric materials with which the present ethane diphosphonates are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The ethane diphosphonates may be incorporated into films of such cellulose derivatives by adding them to the solutions from which the films are cast or into the melts from which the fibers are extruded.

The present ethane diphosphonates are particularly suited to the modification of liquid resin compositions of the polyester type, e.g., the linear polyesters which are obtained by the reaction of one or more polyhydric alcohols with one or more α, β-unsaturated polycarboxylic acids alone or in combination with one or more saturated polycarboxylic acid compounds, or the cross-linked polyester resins which are obtained by reacting the linear polyester with a compound containing a

group.

The cross-linking component of the presently modified polyester resin may be, e.g., styrene, the nuclear or side-chained substituted styrenes such as 3,4-dicholrostyrene, α-chloro-styrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present ethane diphosphonates are compatible and are advantageously used. These resins are condensation products formed by the reaction of a polyhydroxy compound and epichlorohydrin, which condensation products are subsequently cured by addition of cross-linking agents. The hydroxy compound may be e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present ethane diphosphonates. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1,500–5,000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di($\beta$-hydroxyethyl)ether, etc. and/or amino alcohols such as ethanolamine, 3-aminopropanol, 4-aminopropanol, 5-aminopentanol -1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol -2,3, butylene glycol-1,3,2-methylpentanediol-2,4,2-ethylhexane-diol-1,3, hexamethylene glycol, styrene glycol and decamethylene glycol, etc., and diethylene glycol, triethylene glycol, tetraethylene glycol, polythioethylene glycol, polyethylene glycols 200, 400 and 600 etc., dipropylene glycol, tripropylene glycol, trithiopropylene glycol, polypropylene glycols 400, 750, 1,200 and 2,000 etc.

Broadly, any of the polyesters, polyisocyanate-modified polyesters, polyesteramides, polyisocyanate-modified polyester-amides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as bisphenyl carbamates of toluylene diisocyanate, p, p'-diphenylmethane diisocyanate, p-phenylene diisocyanate and 1,5-naphthalene diisocyanate, etc.

For preparation of the flame-retardant polyurethanes, the present ethane diphosphonates are preferably added to a mixture of the reactants and catalyst before hardening. The hardened molded pieces or foams are rendered flame-retardant by the inclusion therein of the ethane diphosphonates in quantities of from about 2 percent to about 25 percent by weight of the polyurethane. Use of the present ethane diphosphonates in the polyurethane foams can also, in some applications, improve the mechanical properties of the foams.

Phenolic resins are also beneficially modified by the present ethane diphosphonates, which compounds can be incorporated into the resin either by milling in molding applications or by addition to film-forming or impregnating and bonding solutions previous to casting. Phenolic resins with which the present ethane diphosphonates compounds are employed are, for example, the phenolaldehyde resins prepared from phenols such as phenol, cresol, xylenol, resorcinol, 4-butylphenol, 4-phenylphenol, and aldehydes such as formaldehyde, acetaldehyde, or butylraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present ethane diphosphonates. Examples thereof are the heat-convertible condensation products of an aldehyde with urea, thiourea, guanidine, cyanimide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of ethane diphosphonates used, they serve to modify their physical properties as well as to render them fire-retardant. When the aminoplasts are destined for use as impregnating agents, bonding adhesives, coatings and casting of films, the ethane diphosphonates are incorporated into solutions or suspensions in which the aminoplast is carried. The resulting mixtures give strong, fire-retardant laminates when sheets of paper, glass, cloth or fabric are impregnated therewith and cured.

Also beneficially modified by the present ethane diphosphonates are the nylons, i.e., the superpolyamides which are generally obtained by the condensation of a diamine, e.g., hexamethylenediamine with a dicarboxylic acid, e.g., adipic acid. Depending upon the quantity of ethane diphosphonates employed and the individual nature of the compound, there are obtained flame-retardant and/or dye receptor effects.

Other polyamides with which the present ethane diphosphonates are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present ethane diphosphonates can be incorporated into molding or extruding compositions for flame-retardant effect and/or to modify the physical properties of such compositions.

The present ethane diphosphonates are also advantageously employed as adjuvants for polymeric aldehydes, e.g., homopolymeric, high-molecular weight formaldehyde.

The present phosphonic anhydrides are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present ethane diphosphonates are flame retardants for such self-condensation products, generally; and where transparentizing effect and dye receptivity are lacking, the ethane diphosphonates are often instrumental in ameliorating such deficiencies.

The following examples are presented to illustrate the invention, with parts and percentages by weight being used in the examples unless otherwise indicated. All polymeric compositions illustrated in the following examples will exhibit reduced burning rates and can be classified as either non-burning or self-extinguishing.

EXAMPLE I

A copolymeric composition is obtained by heating about 0.15 mols of ethylene diamine and about 0.4 mols of the above described compound No. 1, i.e., $H_2C(OH)C(OH)(PO_3H_2)_2$, in benzene to about 80° C. for about 4½ hours. The reaction batch is cooled to room temperature and the benzene distilled off yielding a polymeric composition which softens at about 251°–284° C.

EXAMPLE II

A copolymeric composition is also obtained by blending about 0.3 mols of hexamethylene diamine and about 0.1 mol of an indicated ethane diphosphonate compound, and heating the mixture for 5 hours at about 164° C. and thereafter cooling to room temperature. The added compounds are those heretofore described as compound Nos. 2, 7, 13 and 24.

EXAMPLE III

A copolymeric composition is also obtained by blending about 0.3 mols of ethylene glycol and about 0.1 mol of an indicated ethane diphosphonate compound and then heating the mixture at 90° C. for about 1 hour. Upon cooling to room temperature the composition sets to a solid polymeric composition. The added ethane diphosphonate compounds are those heretofore described as compound Nos. 1, 10, 16, 17, 22 and 29.

EXAMPLE IV

A copolymeric composition is obtained by dissolving about 6.0 parts of $H_2C(OH)C(OH)[PO_3(C_2H_5)_2]_2$ (compound No. 2) in about 120 parts of dimethyl formamide at a reflux temperature of about 125° C., and adding about 3.5 parts of hexamethylene diamine to the solution under refluxing. The polymeric composition precipitates from the solution in the form of a solid material and after cooling to room temperature is removed from the dimethyl formamide solution.

EXAMPLE V

A polymeric composition is obtained by blending 46 parts of oleic acid, 22 parts of glycerine, 18 parts of an indicated ethane diphosphonate compound, and a trace of toluene sulfonic acid and heating the mixture to about 149° C. under a flowing nitrogen blanket sufficient to exclude air and to remove by-product water. After about 61 minutes gelatin occurs and the batch is cooled to room temperature to yield a solid polymeric composition. The added phosphonic anhydride compounds are those heretofore described as compound Nos. 4 5, 8, 21 and 27.

EXAMPLE VI

This example illustrates the preparation of a rigid polyurethane foam using one of the indicated ethane diphosphonates therein as the flame retardant.

| Ingredient | Parts | |
|---|---|---|
| Methyl glucoside based polyol | 100.0 | |
| Trichloromonofluoromethane | 35.0 | |
| "Silicone Y-4316" | | 2.0 |
| Tetramethylbutane diamine | 1.5 | |
| Ethane Diphosphonate | 10.0 | |
| Polyisocyanate "Mondur MR" | 108.0 | |

Footnotes:
1. "Silicone Y-4316" — is a trademark trademark for a silicon foam stabilizer sold by Union Carbide.
2. Ethane diphosphonate are those compound Nos. 3, 11, 15 and 18.
3. Polyisocyanate "Mondur MR" — a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

EXAMPLE VII

A composition is also obtained by adding one of the indicated ethane diphosphonate compounds in an amount sufficient to be about 10 percent by weight based on the weight of the total solids content of a 10 percent benzene solution of a 72:28 molar ratio styrene-acrylonitrile copolymer. The benzene is distilled off yielding a polymeric composition. The added ethane diphosphonate compounds are those heretofore described as Nos. 2, 9, 15, 17, 20 and 28.

EXAMPLE VIII

To a polymer blend of an unsaturated polyester prepared by condensing one mol of an indicated ethane diphosphonate, ½ mol of maleic anhydride, ½ mol of phthalic anhydride and 2.1 mols of propylene glycol to an acid number of about 40 at 200° C., cooling the mixture and dissolving the mixture in a sufficient amount of styrene monomer so that the resulting mixture comprises 30 parts of styrene monomer to 70 parts of polyester, there is added a small amount (3 percent w./w.) of benzoyl peroxide and the resulting mixture is polymerized at 80° C. yielding a thermosetting resin. The added ethane diphosphonate compounds are those heretofore described as compound Nos. 1, 5, 6, 10, 17, 27 and 30.

EXAMPLE IX

To a granular blend of a polystyrene and butadiene-styrene copolymer containing about 6 percent by weight of the copolymer there is added one of the indicated ethane diphosphonate compounds in an amount of about 4 percent by weight by blending for 15 minutes in a tumbling type laboratory blender and then extruding the blend into rods. The added ethane diphosphonate compounds are those heretofore described as compounds Nos. 4, 7, 11, 13, 14, 19, 24 and 26.

EXAMPLE X

To melted samples of a natural high molecular weight low density polyethylene having a density of about 0.9, a melt index of about 0.3 gm./10 min., a softening temperature of about 105° C., and a tensile strength (ultimate) of 2,300 psig, various amounts of one of the indicated ethane diphosphonates sufficient to make compositions wherein the added ethane diphosphonate comprises from about 4 to 8 percent of the total weight of the composition are added. The samples are cooled to room temperature to provide polymer compositions. The added ethane diphosphonate compounds are those heretofore described as compound Nos. 2, 4, 5, 8 20, 27 and 29.

EXAMPLE XI

To a 5 percent solution of a polyvinyl formal in ethylene dichloride there is added one of the indicated ethane diphosphonate compounds in a quantity which is about 20 percent by weight of the total solids content of the solution. Films are cast from such solutions and then air dried for about 24 hours. The added ethane diphosphonate compounds are those heretofore described as compound Nos. 1, 3, 10, 16, 17 and 22.

EXAMPLE XII

Improved films are also obtained when one of the indicated ethane diphosphonate compounds is added to a 10 percent solution of a 50:50 molar ratio styrene-methyl methacrylate copolymer in benzene in an amount sufficient to be about 30 percent by weight of the total solids content and then cast into films which are flexible. The added ethane diphosphonate compounds are those heretofore described as compound Nos. 2, 7, 13, 20, 24 and 29.

EXAMPLE XIII

With about 3 parts of a commercially available condensation product of linoleic acid and a polyamine having an amine value of from 290–320 and a viscosity of 80–120 poises at 40° C., there is mixed 7 parts of diglycidyl ether of Bis-phenol A and a sufficient amount of one of the indicated ethane diphosphonates to make a composition having about 16 percent by weight, based on the weight of the total composition, of the ethane diphosphonate. The resulting reaction mixture is poured into a small aluminum pan ( coated with a silicone grease to prevent sticking) and heated in an oven at 100° C. for about 2 hours. After cooling to room temperature an epoxy resinous product is obtained. The added ethane diphosphonate compounds are those heretofore described as compound Nos. 4, 7, 11, 13, 14, 19, 24 and 26.

EXAMPLE XIV

To samples of a commercial cellulose acetate butyrate having an average acyl content of 13 percent and 37 percent butyryl and a viscosity range of 17–33 seconds (64–124 poises) as determined by ASTM method D–1343–54T (which is incorporated herein by reference) in the solution described as Formula A, ASTM method D–871–54T (which is incorporated herein by reference) are blended on hot mill rolls a sufficient amount of one of the indicated ethane diphosphonates such that the final compositions contain from about 10 to 15 percent by weight of the added ethane diphosphonate. After blending the samples are cooled to room temperature to obtain a polymeric composition. The added ethane diphosphonates are those heretofore described as compound Nos. 1, 5, 6, 9, 10, 15, 17, 27 and 30.

EXAMPLE XV

To a 10 percent ethylene dichloride solution of polyvinyl acetate there is added one of the indicated ethane diphosphonate compounds in a quantity which is one-half by weight to that of the polyvinyl acetate present in the solution. Films cast from the resulting mixture are flexible. The added ethane diphosphonate compounds are those heretofore described as compound Nos. 5, 8, 11, 12 and 22.

EXAMPLE XVI

To melted samples of a commercial rigid polymethyl methacrylate polymer there is blended on hot mill rolls one of the indicated ethane diphosphonate in an amount sufficient to provide about 20 percent of the ethane diphosphonate per total weight of the composition. The samples are milled into sheets in order to obtain polymeric compositions. The added ethane diphosphonates are those heretofore described as compound Nos. 2, 9, 15, 17 and 20.

EXAMPLE XVII

To 100 parts of a polyvinyl chloride resin there is added 50 parts of dioctyl phthalate and 50 parts of $H_2C(OH)C(OH)[PO_3(C_2H_5)_2]_2$. The mixture is placed on hot mill rolls and blended. When thoroughly blended, the product is stripped from the rolls and pressed into square shaped pieces which are soft pliable plastic.

EXAMPLE XVIII

A salt is prepared from hexamethylene diamine and adipic acid by mixing about 144 parts of amine with about 150 parts of the acid in the presence of 1,300 parts of 95 percent ethyl alcohol and 210 parts of water. The mass is warmed until complete solution occurs and then cooled to obtain crystals of hexamethylene diammonium adipate. To this salt is added about 16 parts of $H_2C(OH)C(OH)[PO_3(C_2H_5)_2]_2$ and the mixture heated for about 3 hours with an equal weight of mixed xylenols (B.P. 218°–222° C.) and the entire reaction mass is then poured gradually with stirring into a large volume of ethyl alcohol. The modified polyamide precipitates as a granular powder and is filtered, washed with alcohol and dried.

EXAMPLE XIX

The various organic compositions prepared in the aforegoing Examples I through XVIII and which contain the ethane diphosphonates are each individually subjected to the burn test, ASTM–D1692–59T, heretofore described. In all cases, the organic compositions are found to either demonstrate no evidence of burning or to be "self-extinguishing." The same organic compositions which do not contain the ethane diphosphonates are utilized as the control materials and are tested in the same manner. These "control materials" are found in all cases to either burn or go beyond the "second gauge line," i.e., they do not exhibit "self-extinguishing" characteristics as defined by said test. Thus the utility of the present invention compositions is vividly demonstrated.

EXAMPLE XX

A control polyurethane foam is prepared by heating 10 mols of trimethylolpropane with 6 mols of adipic acid to an almost nil acid number and a hydroxyl number of 504. This polyester is formed with its own prepolymer, the prepolymer being a mixture of 20% of the above polyester and 80 percent of toluene diisocyanate. The mixture of the above two formulations is expanded with trichlorofluoromethane in the normal manner to yield a 2.5 pounds per cubic foot density foam. The fire resistance of this foam, measured by the American Society for Testing Materials D–757 Test (which is incorporated herein by reference), is found to be about 10 inches per minute.

The polyurethane foam formulation described immediately above is again prepared; however, 7.5 percent by weight of an ethane diphosphonate having the formula $H_2C(OH)C(OH)[PO_3(C_2H_5)_2]_2$ is added. The fire resistance of the final urethane foam is measured by the ASTM D–757 test indicated above. The results of this test show the fire resistance of the foam is less than about 0.6 inches per minute.

What is claimed is:

1. A flame resistant polyurethane prepared by reacting ( 1 ) a polyol, (2) an organic polyisocyanate and (3) from about 1 percent to about 50 percent by weight, based on the total weight of ( 1 ) and (2), of an ethane diphosphonate having the formula

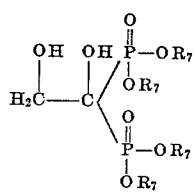

wherein $R_7$ is selected from the group consisting of hydrogen, alkyl containing from one to four carbon atoms and mixtures thereof.

2. A flame resistant polyurethane prepared by reacting (1) a polyol, (2) an organic polyisocyanate and (3) from about 1 percent to about 50 percent by weight, based on the total weight of (1) and (2), of an ethane diphosphonate having the formula

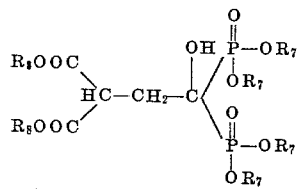

wherein $R_7$ is selected from the group consisting of hydrogen, alkyl containing from one to four carbon atoms and mixtures thereof, and $R_8$ is an alkyl group containing from one to four carbon atoms.

3. A flame resistant polyurethane prepared by reacting (1) a polyol (2) an organic polyisocyanate and (3) from about 1 percent to about 50 percent by weight, based on the total weight of (1) and (2), of an ethane diphosphonate having the formula

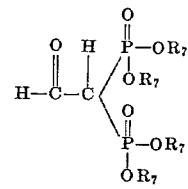

wherein $R_7$ is selected from the group consisting of hydrogen, alkyl containing from one to eight carbon atoms.

4. A flame resistant polyurethane prepared by reacting (1) a polyol, (2) an organic polyisocyanate and (3) from about 1 percent to about 50 percent by weight, based on the total weight of (1) and (2), of an ethane diphosphonate selected from the group consisting of
1,2-dihydroxyethane-1,1-diphosphonic acid,
2-cyano-1-hydroxyethane-1,1-diphosphonic acid,
diphenyl-2-benzoyl-1-hydroxyethane-1,1-diphosphonate,
2-thiomethyl-1-hydroxyethane-1,1-diphosphonic acid,
2-oxyethane-1,1-diphosphonic acid, and mixtures thereof.

* * * * *